US010967711B2

(12) United States Patent
Chen et al.

(10) Patent No.: US 10,967,711 B2
(45) Date of Patent: Apr. 6, 2021

(54) CLOSING MECHANISM FOR AN AIRFLOW OUTLET OF AN HVAC AIRFLOW DISTRIBUTION MODULE

(71) Applicant: DENSO International America, Inc., Southfield, MI (US)

(72) Inventors: Siyue Chen, Northville, MI (US); Brian Belanger, Farmington Hills, MI (US); Kai Zhang, Novi, MI (US); Greg Thompson, Ortonville, MI (US)

(73) Assignee: DENSO International America, Inc., Southfield, MI (US)

( * ) Notice: Subject to any disclaimer, the term of this patent is extended or adjusted under 35 U.S.C. 154(b) by 264 days.

(21) Appl. No.: 16/134,362

(22) Filed: Sep. 18, 2018

(65) Prior Publication Data

US 2019/0126725 A1    May 2, 2019

Related U.S. Application Data

(60) Provisional application No. 62/577,213, filed on Oct. 26, 2017.

(51) Int. Cl.
*B60H 1/34* (2006.01)
*B60H 1/00* (2006.01)
*F24F 13/12* (2006.01)

(52) U.S. Cl.
CPC .......... *B60H 1/34* (2013.01); *B60H 1/00021* (2013.01); *B60H 1/00064* (2013.01);
(Continued)

(58) Field of Classification Search
CPC ....... F24F 13/12; B60H 1/00692; B60H 1/34; B60H 1/00021; B60H 2001/00192;
(Continued)

(56) References Cited

U.S. PATENT DOCUMENTS 6,224,480 B1 * 5/2001 Le ..................... B60H 1/00692
454/156
7,410,201 B1 * 8/2008 Wilson ................ E05F 15/652
296/146.16
(Continued)

*Primary Examiner* — Kenneth J Hansen
*Assistant Examiner* — Dana K Tighe
(74) *Attorney, Agent, or Firm* — Harness, Dickey & Pierce, P.L.C.

(57) ABSTRACT

A heating, ventilation, and air conditioning (HVAC) airflow distribution module with an outlet closing mechanism for a vehicle including a driver face airflow outlet defined by an HVAC module. A passenger face airflow outlet defined by the HVAC module having a center portion and a side portion. An adaptor including a door driving mechanism to control a telescoping door sub-assembly, which is mounted at the passenger face airflow outlet and is movable between a retracted position at which the telescoping door sub-assembly does not obstruct the airflow through the passenger face airflow outlet by being packaged away from outlets, and any one of a plurality of extended positions at which the telescoping door sub-assembly obstructs the side portion or both the side and center portions of the passenger face airflow outlet at different blocking levels when no passenger is present to save energy, improve fuel economy, and/or increase battery life.

20 Claims, 3 Drawing Sheets

(52) U.S. Cl.
CPC ..... *B60H 1/00692* (2013.01); *B60H 1/00742* (2013.01); *F24F 13/12* (2013.01); *B60H 2001/002* (2013.01); *B60H 2001/00192* (2013.01); *B60H 2001/3464* (2013.01); *B60H 2001/3471* (2013.01)

(58) Field of Classification Search
CPC .... B60H 2001/3464; B60H 2001/3471; F23H 13/04; F05B 2240/2021
USPC ... 454/154–155, 129, 136, 161, 55–67, 184, 454/187
See application file for complete search history.

(56) References Cited

U.S. PATENT DOCUMENTS

| | | | |
|---|---|---|---|
| 9,120,572 B2 * | 9/2015 | Wilkinson | B64D 11/00 |
| 2004/0049984 A1 * | 3/2004 | Pfaff | E05F 17/00 49/116 |
| 2018/0272832 A1 * | 9/2018 | Fusco | B60H 1/00671 |

* cited by examiner

CLOSING MECHANISM FOR AN AIRFLOW OUTLET OF AN HVAC AIRFLOW DISTRIBUTION MODULE

CROSS-REFERENCE TO RELATED APPLICATION

This application claims the benefit of U.S. Provisional Application No. 62/577,213, filed on Oct. 26, 2017, the entire disclosure of which is incorporated herein by reference.

FIELD

The present disclosure relates to a closing mechanism for an airflow outlet of a heating, ventilation, and air conditioning (HVAC) airflow distribution module.

BACKGROUND

This section provides background information related to the present disclosure, which is not necessarily prior art.

Vehicles typically include a heating, ventilation, and air conditioning (HVAC) system to regulate the temperature of the main cabin. The HVAC system typically includes an HVAC airflow distribution module, which typically houses a heater core and an evaporator. The HVAC airflow distribution module further includes a driver face airflow outlet, which is divided into a driver center face outlet and a driver side face outlet; and a passenger face airflow outlet, which is divided to a passenger center face outlet and a passenger side face outlet. Airflow from the driver face airflow outlet is directed to driver face ducts. Airflow from the passenger face airflow outlet is directed to passenger face ducts. While existing HVAC airflow distribution modules are suitable for their intended use, they are subject to improvement. For example, when the vehicle does not have a front passenger, airflow flowing from the entire passenger face airflow outlet of the HVAC airflow distribution module is "wasted" because it cools an area of the cabin where no person is seated. An HVAC airflow distribution module able to direct airflow only to occupied areas of the vehicle cabin would therefore be desirable. The present disclosure advantageously provides for an improved HVAC airflow distribution module that addresses these issues in the art.

SUMMARY

This section provides a general summary of the disclosure, and is not a comprehensive disclosure of its full scope or all of its features.

The present disclosure provides for a heating, ventilation, and air conditioning (HVAC) airflow distribution module for a vehicle. The HVAC airflow distribution module includes a driver airflow outlet and a passenger airflow outlet. A telescoping door sub assembly is mounted above the passenger face airflow outlets, and is movable between a retracted position at which the telescoping door does not obstruct the passenger face airflow outlets, and any one of a plurality of extended positions at which the telescoping door obstructs the passenger face airflow outlet, the door driving mechanism in cooperation with the telescoping door sub-assembly to move the telescoping door sub assembly between the retracted position and any one of the plurality of extended positions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
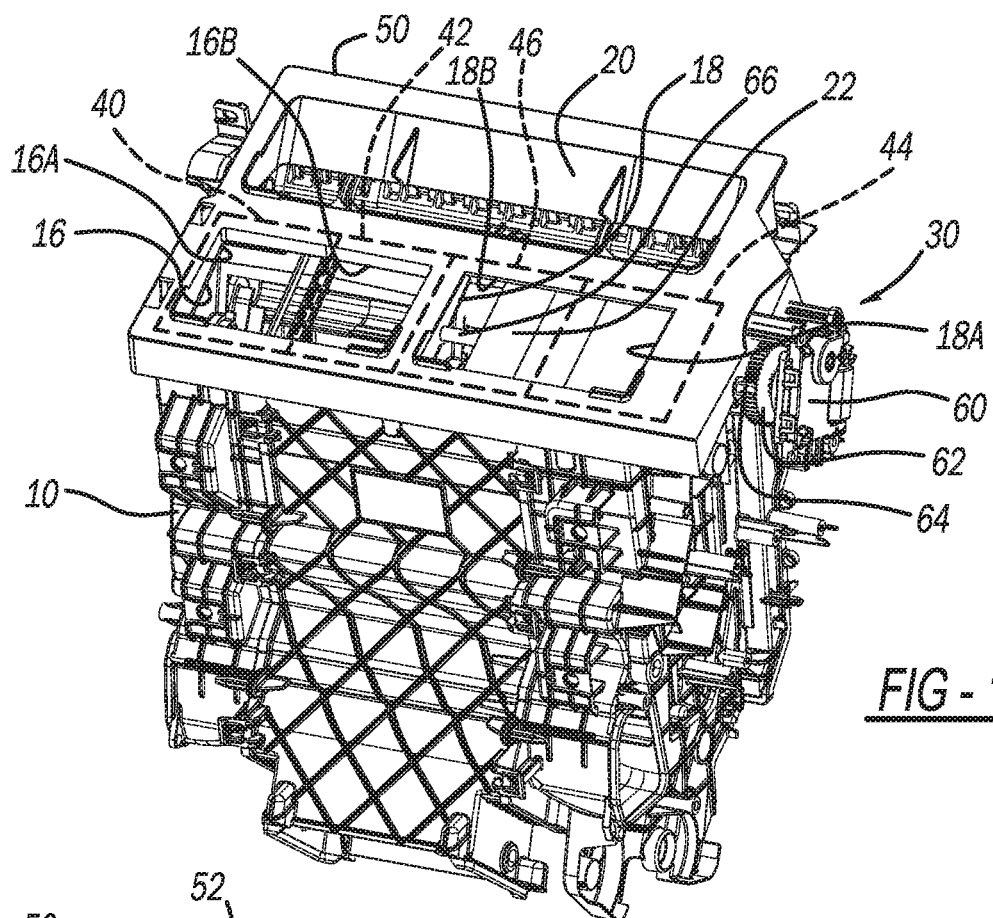
FIG. 1 is a perspective view of a heating, ventilation, and air conditioning (HVAC) airflow distribution module in accordance with the present disclosure for a vehicle.

With initial reference to FIG. 1, a heating, ventilation, and air conditioning (HVAC) airflow distribution module in accordance with the present disclosure is illustrated at reference numeral 10. The HVAC airflow distribution module 10 can be configured for use in any suitable vehicle to regulate temperature of a passenger cabin of the vehicle. For example, the HVAC airflow distribution module 10 can be configured for use with any suitable passenger vehicle, mass transit vehicle, military vehicle, commercial vehicle, construction equipment, mining equipment, aircraft, watercraft, etc. The HVAC airflow distribution module 10 may be configured for use in any suitable non-vehicular application as well.

Airflow exits the airflow distribution module 10 through a driver face airflow outlet 16, a passenger face airflow outlet 18, and/or a defrost outlet 20. The driver's side face airflow outlet 16 includes a driver side face outlet 16A and a driver center face outlet 16B. The passenger face airflow outlet 18 includes a side portion 18A and a center portion 18B. Airflow exiting the airflow distribution module 10 through the passenger's side face airflow outlet 18 is regulated by a telescoping door sub-assembly 22, as described in detail herein.

The HVAC airflow distribution module 10 is arranged within the vehicle such that the driver face airflow outlet 16 is adjacent to a driver side face duct 40 and a driver center face duct 42, each of which direct air to air vents on the driver of the main cabin. The side face outlet 16A is aligned with the side duct 40 and the center face outlet 16B is aligned with the center duct 42. The passenger face airflow outlet 18 is arranged to direct airflow through a passenger side face duct 44 and a passenger center face duct 46, which direct airflow to side and center passenger airflow ducts respectively of the main cabin. The side outlet 18A is aligned with the side face duct 44 and the center outlet 18B is aligned with the center face duct 46.

The telescoping door sub-assembly 22 is movable across the passenger's side face airflow outlet 18 by any suitable actuating method, such as the door driving mechanism 30. As described in detail herein, the door driving mechanism 30 is generally a worm drive configured to move the telescoping door sub-assembly 22 to a retracted position in which the telescoping door does not extend out into the passenger face airflow outlet 18 at all, or at any suitable extended position in which the telescoping door sub-assembly 22 restricts airflow through the passenger face airflow outlet 18, such as through the side portion 18A and potentially the center portion 18B based on different airflow blocking levels. For example and as illustrated in FIG. 1, when the telescoping door sub-assembly 22 is arranged in the illustrated extended position airflow is completely restricted from flowing through the passenger side face duct 44, and to passenger side face area of the main cabin. In the example of FIG. 1, the telescoping door sub-assembly 22 partially obstructs the passenger center face duct 46, and thus airflow to the passenger center face area of the cabin is partially obstructed. Specifically, in FIG. 1 the door subassembly 22 completely blocks airflow through side face outlet 18A and side face duct 44, and partially blocks airflow through center face outlet 18B and center face duct 46. Advantageously, the telescoping door sub-assembly 22 is configured to not fully extend across the passenger airflow outlet 18 to balance airflow through the HVAC system so that the overall vehicle recirculation can be maintained at a comfort level.

Figure 2:
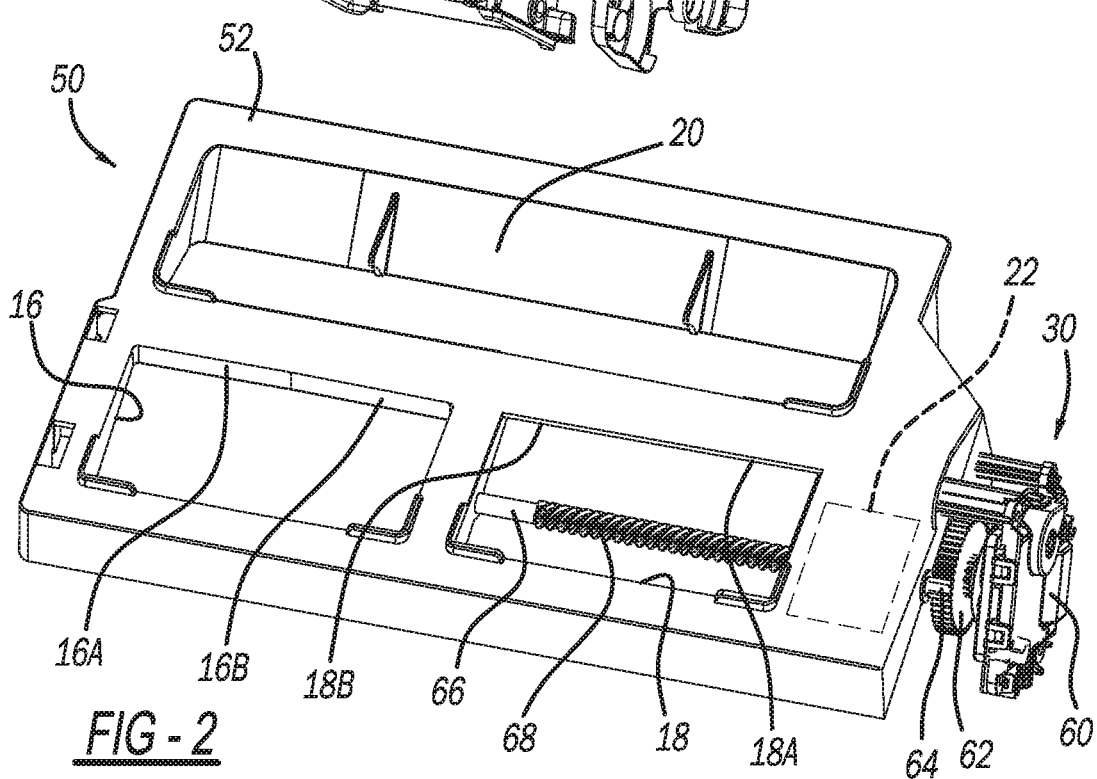
FIG. 2 is a front perspective view of an adapter of the HVAC airflow distribution module of FIG. 1 defining a driver face airflow outlet, a passenger face airflow outlet, a defrost outlet, a door driving mechanism, and a telescoping door sub assembly.
Figure 3:
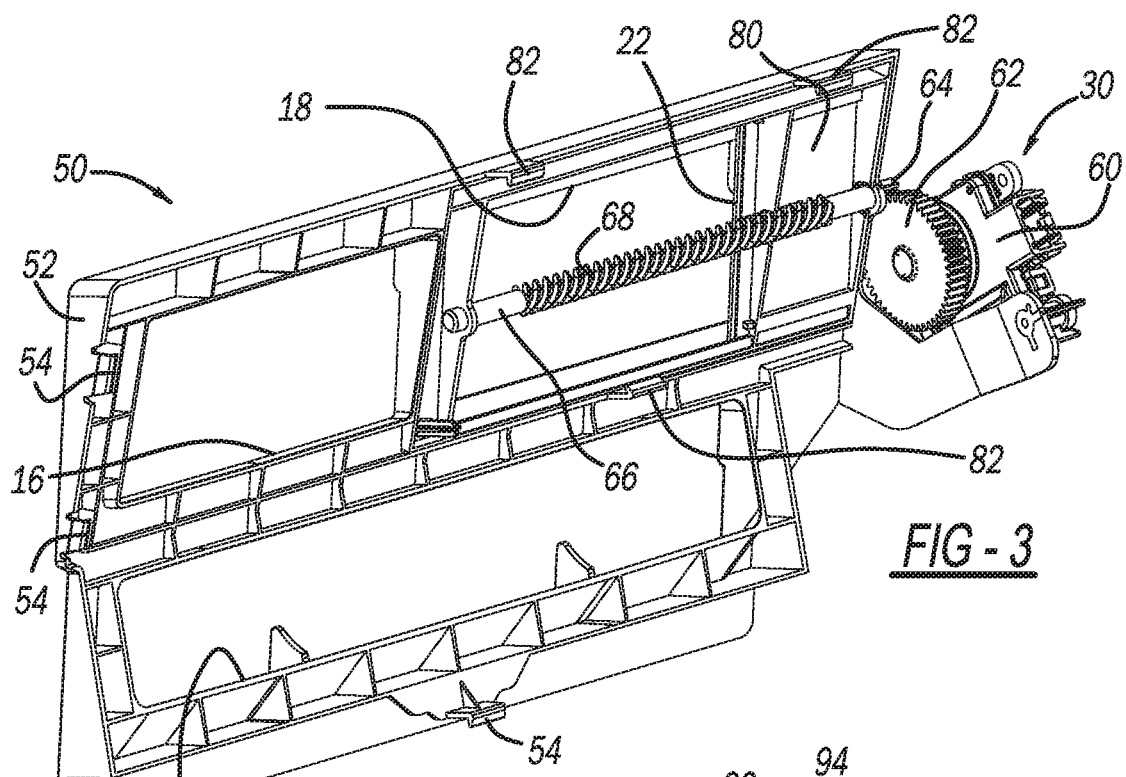
FIG. 3 is a rear perspective view of the adapter of FIG. 2 with a telescoping door sub assembly thereof in an open position.
Figure 4:
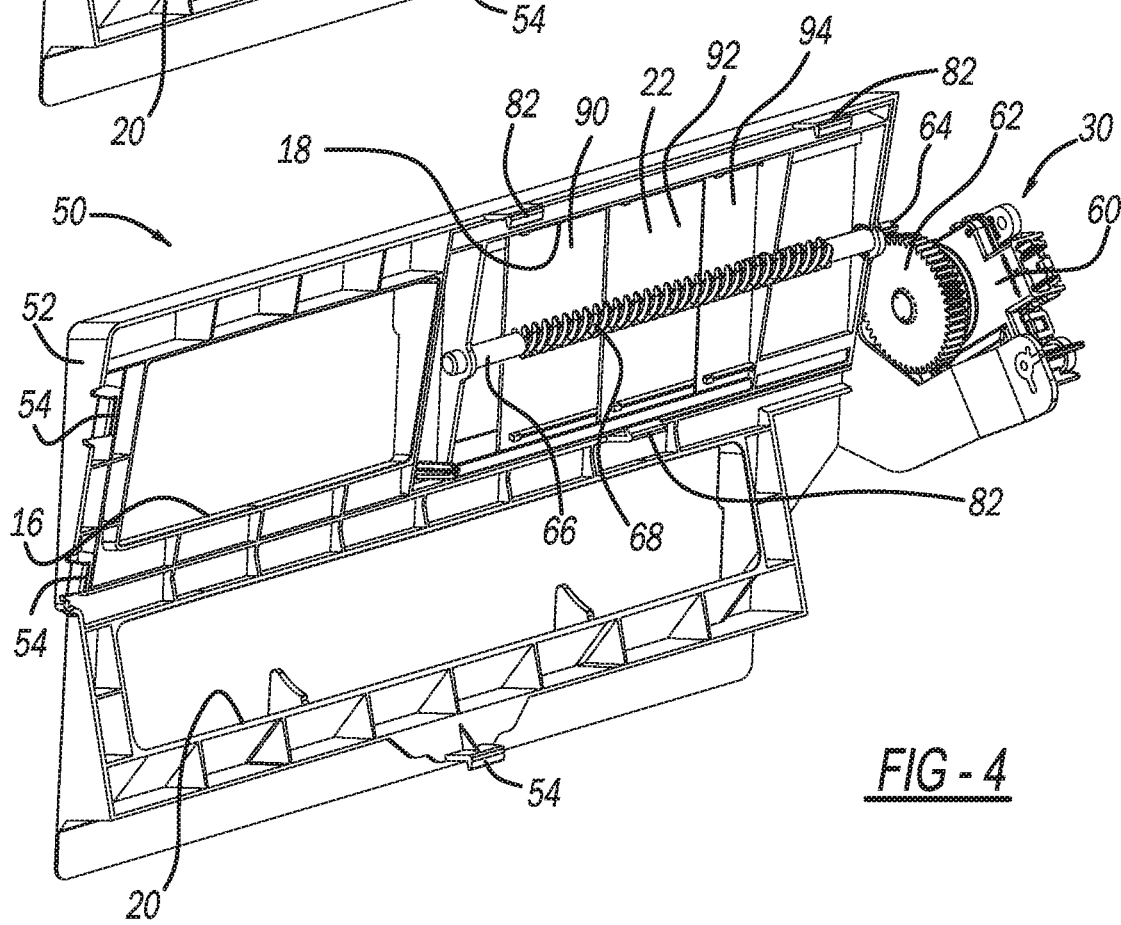
FIG. 4 is a rear perspective view of the adapter of FIG. 2 with the telescoping door sub assembly thereof in a closed position.

In some applications, the driver face airflow outlet 16 and the passenger face airflow outlet 18 are defined by an adapter 50, which can be secured to the airflow distribution module 10 in any suitable manner. With continued reference to FIG. 1 and additional reference to FIGS. 2-4, the adapter 50 includes an upper case 52. As illustrated in FIGS. 3 and 4, the upper case 52 may include any suitable coupling members 54 configured to couple the adapter 50 to the HVAC airflow distribution module 10. Thus the adapter 50 may be configured as a retro-fit adapter to provide any suitable HVAC airflow distribution module with the telescoping door sub-assembly 22 of the present disclosure.

The door driving mechanism 30 may be mounted to the adapter 50 as illustrated, or the door driving mechanism 30 may be integral with the HVAC airflow distribution module 10. The door driving mechanism 30 generally includes an actuator 60, a driving spur gear 62, a driven spur gear 64, and a worm 66, which includes threads 68. The actuator 60 rotates the driving spur gear 62, which is meshed with the driven spur gear 64 so as to rotate the gear 64 and the worm 66 extending therefrom. The worm 66 extends across the passenger face airflow outlet 18, such as entirely across as illustrated. In applications where the telescoping door sub-assembly 22 does not extend entirely across the passenger face airflow outlet 18, the threads 68 may not extend entirely across the outlet 18 as illustrated.

The worm 66 may be mounted to a lower case 80, as illustrated in FIGS. 3 and 4. The lower case 80 can be coupled to the upper case 52 of the adaptor 50 in any suitable manner, such as with fasteners or clips 82. In some applications, the lower case 80 may be mounted directly to the HVAC airflow distribution module 10, such as applications where the outlets 16, 18, and 20 are defined directly by the airflow distribution module 10, and the adapter 50 is not included.

Figure 5:
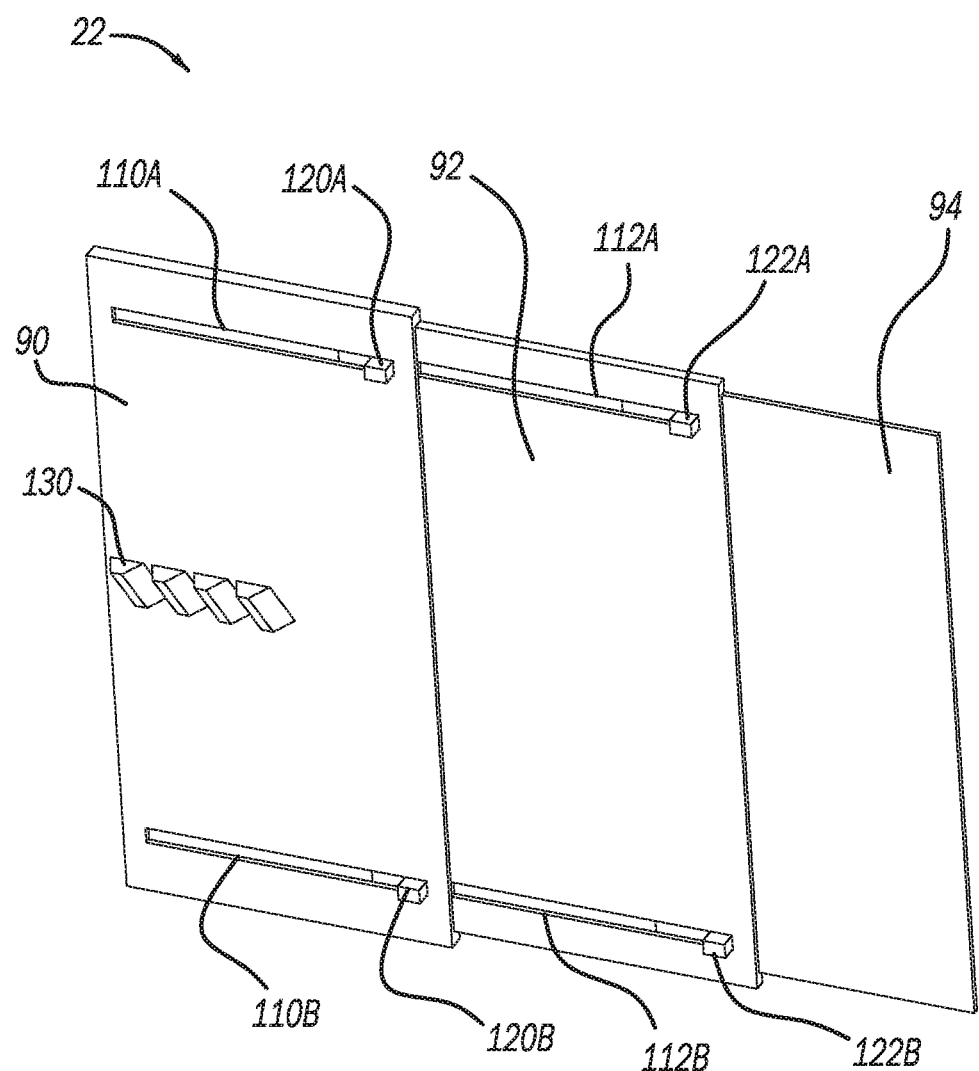
FIG. 5 is an isolated perspective view of the telescoping door sub assembly.

With additional reference to FIG. 5, the telescoping door sub-assembly 22 includes a plurality of panels. Any suitable number of panels may be included. In the example illustrated, the telescoping door sub-assembly 22 includes a first panel 90, a second panel 92, and a third panel 94. The second panel 92 is between the first panel 90 and the third panel 94. The panels 90, 92, and 94 are connected in any suitable manner, such as by way of a series of posts seated in channels. For example, the first panel 90 defines first channels 110A and 110B. The second panel 92 includes second posts 120A and 120B, which are respectively seated within the first channels 110A and 110B. The second panel 92 defines a pair of second channels 112A and 112B. Third posts 122A and 122B of the third panel 94 are respectively seated within the second channels 112A and 112B. The first panel 90 includes an actuator coupler 130, which is configured to mate with the threads 68 of the worm 66. In the example illustrated, the actuator coupler 130 includes a plurality of teeth that mesh with the threads 68. Because the panels 90, 92, and 94 are interconnected by the channels and posts, only the first panel 90 need include the actuator coupler 130.

Actuation of the telescoping door sub-assembly 22 across the passenger airflow outlet 18 will now be described in detail. As illustrated in FIG. 3, in the retracted position the telescoping door sub-assembly 22 is arranged between the upper case 52 and the lower case 80 with the panels 90, 92, and 94 stacked upon one another. This retracted arrangement advantageously saves space because the different panels 90, 92, and 94 may be compactly arranged off to the side of the outlet 18, as illustrated in FIGS. 2 and 3. To move the telescoping door sub-assembly 22 from the retracted position to any one of the extended positions, the actuator 60 is activated, which results in rotation of the worm 66 as explained above.

Due to cooperation between the threads 68 and the teeth 130, as the worm 66 rotates the first panel 90 is pulled into the airflow outlet 18 in order to restrict at least a portion of the outlet 18. As the first panel 90 is pulled by the worm 66, the second posts 120A and 120B slide within the first channels 110A and 110B until the second posts 120A and 120B hit an edge of the channels 110A and 110B, as illustrated in FIG. 5. Then further movement of the first panel 90 across the outlet 18 by the worm 66 will also pull the second panel 92 into the outlet 18 in order to further restrict airflow through the outlet 18. Once the second panel 92 is pulled far enough such that the third posts 122A and 122B reach an end of the second channels 112A and 112B, further movement of the second panel 92 across the outlet 18 will pull the third panel 94 into the outlet 18. Rotation of the worm 66 in an opposite direction will first move the first panel 90 along the worm 66, followed by the second panel 92 and the third panel 94 due to interaction between the posts 120A/120B and channels 110A/110B, as well as third posts 122A/122B and second channels 112A and 112B. The worm 66 may be rotated to position the first panel 90 at any suitable position along the threads 68 of the worm 66 (with the second and third panels 92 and 94 following movement of the first panel 90) in order to control how much airflow passes through the passenger airflow outlet 18.

Arranging the worm 66 such that it extends entirely across the outlet 18 obstructs airflow flowing through the outlet 18, but makes the airflow more laminar, which provides the unexpected advantage of reducing airflow turbulence and lowering the pressure drop across the outlet 18. Thus, the volume of airflow through the outlet 18 is advantageously increased as compared to applications that do not include the worm 66 extending entirely across the outlet 18.

The present disclosure therefore provides numerous advantages. For example, the telescoping door sub-assembly 22 can be positioned at any suitable location across the outlet 18 in order to control the amount of airflow through the outlet 18, which is coupled with the passenger side face duct 44 and the passenger center face duct 46. When the telescoping door sub-assembly 22 is in the fully extended position of FIG. 1, for example, airflow through the passenger side face duct 44 (and the passenger cabin vents associated therewith) is fully restricted, which prevents airflow from flowing to passenger side face outlet of the vehicle cabin when no passenger is present, and advantageously reduces "wasted" airflow. Airflow through the passenger center face duct 46 is partially restricted, to reduce airflow through vents at the passenger center face area, thus further reducing the amount of "wasted" airflow when no passenger is present. By not entirely closing the outlet 18, a reduced amount of airflow is allowed to pass through the passenger center face duct 46 to balance airflow through the HVAC system so that the vehicle recirculation can be maintained at a comfort level.

An additional advantage is the telescoping arrangement of the door sub-assembly 22, which allows the door to be compactly arranged to the side of the outlet 18 when the door sub-assembly 22 is in the retracted position of FIGS. 2 and 3. Reducing "wasted" airflow to the passenger face when no passenger is present advantageously saves energy and may improve fuel economy of the vehicle, and/or increase battery life (such as with respect to hybrid vehicles, partial electric vehicles, or fully electric vehicles). One skilled in the art will recognize that the present disclosure provides numerous additional advantages and unexpected results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) airflow distribution module with an outlet closing mechanism for a vehicle comprising:
   a driver face airflow outlet of a HVAC case having a center face outlet portion and a side face outlet portion;
   a passenger face airflow outlet of the HVAC case having a center face outlet portion and a side face outlet portion;
   a telescoping door sub-assembly mounted over the passenger face airflow outlet, the telescoping door sub-assembly is movable between a retracted position at which the telescoping door sub-assembly does not obstruct the passenger face airflow outlet, and movable to any one of a plurality of extended positions at which the telescoping door sub-assembly obstructs the side face outlet portion of the passenger face airflow outlet or both the side face outlet portion and the center face outlet portion of the passenger face airflow outlet at different airflow blocking levels, the telescoping door sub-assembly including a plurality of panels, adjacent ones of the plurality of panels are in nesting cooperation with each other; and a door driving mechanism in cooperation with the telescoping door sub-assembly to move the telescoping door sub-assembly between the retracted position and any one of the plurality of extended positions.

2. The HVAC airflow distribution module of claim 1, wherein the plurality of panels are arranged such that adjacent ones of the plurality of panels slide against one another as the telescoping door sub-assembly moves between the retracted position and any one of the plurality of extended positions; and the panels are arranged at different layers doors are fully retracted.

3. The HVAC airflow distribution module of claim 2, wherein at least one of the plurality of panels includes a post seated within a channel defined by another one of the plurality of panels, the post slides within the channel as the telescoping door sub-assembly moves between the retracted position and any one of the plurality of extended positions.

4. The HVAC airflow distribution module of claim 2, wherein:

the plurality of panels include at least a first panel, a second panel, and a third panel;

the second panel is between the first panel and the third panel;

the first panel sits at a bottom layer of the plurality of panels and defines a pair of first channels in receipt of a pair of second posts of the second panel;

the second panel sits at a middle layer and defines a pair of second channels in receipt of a pair of third posts of the third panel; and the third panel sits at a top layer and defines a pair of posts to engage with the pair of channels on the second panel.

5. The HVAC airflow distribution module of claim 4, wherein the first panel cooperates directly with the door driving mechanism, the door driving mechanism directly engages with either a top portion or a bottom portion of the first panel to coordinate with different vehicle environment requirements.

6. The HVAC airflow distribution module of claim 4, wherein the first panel includes a worm coupler in cooperation with a worm of a worm drive included with the door driving mechanism.

7. The HVAC airflow distribution module of claim 1, wherein the door driving mechanism includes:

an actuator; and a worm drive mechanism driven by the actuator, the worm drive mechanism includes a driving spur gear rotated by the servo, a driven spur gear meshed with the driving spur gear, and a worm that rotates with the driven spur gear and is in cooperation with the telescoping door sub-assembly.

8. The HVAC airflow distribution module of claim 7, wherein the worm extends across the side outlet and the center outlet of the passenger face airflow outlet.

9. The HVAC airflow distribution module of claim 8, wherein teeth of the telescoping door sub-assembly mesh with the worm; and wherein rotation of the worm moves the telescoping door sub-assembly between the retracted position and any one of the plurality of extended positions.

10. An adaptor configured to be attached to a heating, ventilation, and air conditioning (HVAC) airflow distribution module for a vehicle, the adaptor comprising:

a driver face airflow outlet defined by an upper case of the adaptor including a side portion and a center portion to be respectively seated over a side outlet and a center outlet of a driver face airflow outlet of the HVAC airflow distribution module;

a passenger face airflow outlet defined by the upper case of the adaptor including a side portion and a center portion to be respectively seated over a side outlet and a center outlet of a passenger face airflow outlet of the HVAC airflow distribution module;

a door driving mechanism coupled to the upper case at the passenger airflow outlet defined by the upper case;

a telescoping door sub-assembly between the upper case and the door driving mechanism, the telescoping door sub-assembly movable between a retracted position at which the telescoping door sub-assembly does not obstruct the passenger face airflow outlet, and movable to any one of a plurality of extended positions at which the telescoping door sub-assembly obstructs the side portion of the passenger face airflow outlet or both the side portion and the center portion of the passenger face airflow outlet at different airflow blocking levels, the telescoping door sub-assembly including a plurality of panels, adjacent ones of the plurality of panels are in nesting cooperation with each other; and the door driving mechanism cooperates with the telescoping door sub-assembly to move the telescoping door sub-assembly between the retracted position and any one of a plurality of extended positions.

11. The adaptor of claim 10, further comprising coupling members that couple the door driving mechanism to the HVAC airflow distribution module.

12. The adaptor of claim 10, further comprising adaptor coupling members that couple a lower case to the upper case.

13. The adaptor of claim 10, wherein the door driving mechanism includes an actuator mounted to the adaptor and a worm drive driven by the actuator, the telescoping door sub-assembly is moved between the retracted position and any one of the plurality of extended positions by the worm drive.

14. The adaptor of claim 13, wherein the worm drive includes:

a driving spur gear rotated by the servo, a driven spur gear meshed with the driving spur gear, and a worm that rotates with the driven spur gear and is in cooperation with the telescoping door sub-assembly.

15. The adaptor of claim 14, wherein the worm is mounted to a lower case, or between the upper case and the lower case.

16. The adaptor of claim 14, wherein teeth of the telescoping door sub-assembly mesh with the worm; and wherein rotation of the worm moves the telescoping door sub-assembly between the retracted position and any one of the plurality of extended positions.

17. The adaptor of claim 10, wherein the plurality of panels are arranged at different layers such that adjacent ones of the plurality of panels slide against one another as the telescoping door sub-assembly moves between the retracted position and any one of the plurality of extended positions, at the retracted position the plurality of panels only occupy a single-layer space.

18. The adaptor of claim 17, wherein at least one of the plurality of panels includes a post seated within a channel defined by another one of the plurality of panels, the post slides within the channel as the telescoping door subassembly moves between the retracted position and any one of the plurality of extended positions.

19. The adaptor of claim 17, wherein:
the plurality of panels include at least a first panel, a second panel, and a third panel;
the second panel is between the first panel and the third panel;
the first panel sits at a bottom layer and defines a pair of first channels in receipt of a pair of second posts of the second panel;
the second panel sits at a middle layer and defines a pair of second channels in receipt of a pair of third posts of the third panel; and
the third panel sits at a top layer and defines a pair of posts to engage with the pair of channels on the second panel.

20. The adaptor of claim 19, wherein:
the first panel cooperates directly with the door driving mechanism; and
the first panel includes a worm coupler in cooperation with a worm of a worm drive included with the door driving mechanism, the door driving mechanism directly engages with either a top layer or a bottom layer of the plurality of panels to coordinate with different vehicle environment requirements.

* * * * *